No. 781,110. PATENTED JAN. 31, 1905.
E. A. STULZ.
EXPANSION BOLT.
APPLICATION FILED AUG. 26, 1904.
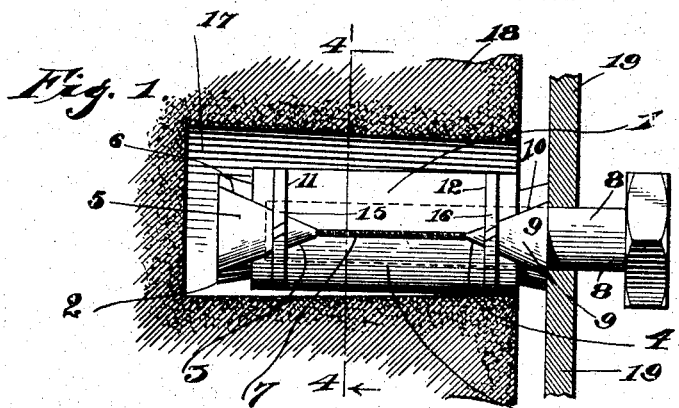
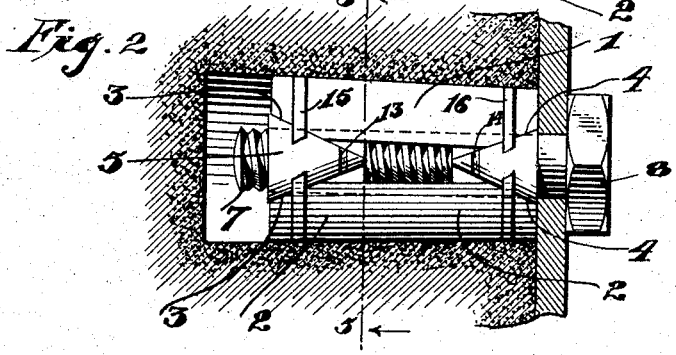
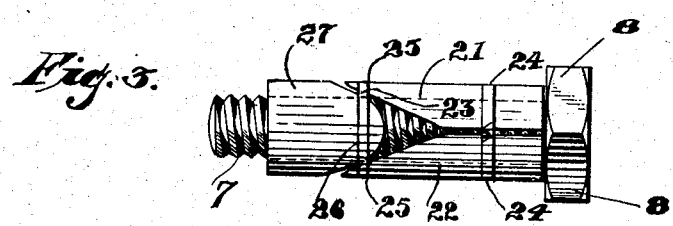
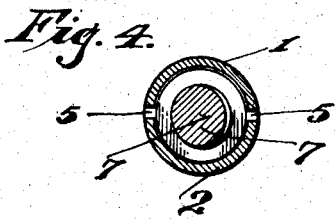
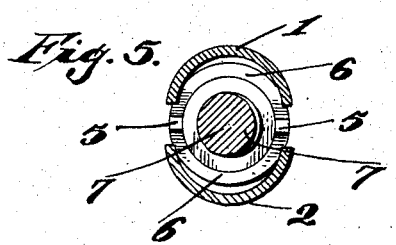
WITNESSES
INVENTOR.
EDWARD A. STULZ
BY Dickerson Brown,
Raegener & Binney, ATTORNEYS.

No. 781,110.

Patented January 31, 1905.

UNITED STATES PATENT OFFICE.

EDWARD ANTHONY STULZ, OF AVENEL, NEW JERSEY.

EXPANSION-BOLT.

SPECIFICATION forming part of Letters Patent No. 781,110, dated January 31, 1905.

Application filed August 26, 1904. Serial No. 222,222.

*To all whom it may concern:*

Be it known that I, EDWARD ANTHONY STULZ, a citizen of the United States, residing at Avenel, New Jersey, have invented certain new and useful Improvements in Expansion-Bolts, of which the following is a description.

My invention relates to expansion-bolts such as are used in stone, brickwork, and the like, and particularly to the cartridges or shells in which the bolt proper is engaged. It provides means for retaining the parts which constitute such cartridges or shells in position when they are not in use, so as to prevent the parts being separated or lost.

Figure 1 is a side elevation of an expansion-bolt embodying my invention placed in a suitable recess. Fig. 2 is a similar view of the bolt tightened up. Fig. 3 is a side elevation of a modified form of the device. Figs. 4 and 5 are respectively vertical sections through the planes 4 4 and 5 5 of Figs. 1 and 2, respectively.

Referring to the drawings, 1 2 represent longitudinally-divided halves of a shell portion, the ends 3 and 4 of which are cut away or beveled, as shown, so that they coact to form a tapered recess. I have shown a shell portion as comprised of two semitubular members, and this is the preferred form of construction. It is, however, possible to increase the number of tubular segments as desired. A nut 5, provided with the usual taper walls 6, engages between the shell portions 1 and 2 in the usual manner and is of course internally threaded to receive the threaded end 7 of the bolt 8. A collar 9 engages between the beveled ends 4 of the shell portions, having the usual wedge-shaped walls 10 for this purpose. It may be similar to the nut 5, except that it is bored to freely pass the body of the bolt 8. Adjacent each end of the shell portions 1 and 2 are cut grooves 11 and 12, and in the nut 5 and collar 9, respectively, are cut transverse grooves 13 and 14. When the nut 5 and collar 9 are in their retracted position, in which they do not act to expand the cartridge, the grooves 11 in the shells 1 and 2 and the groove 13 in the nut 5 coact to form an annular groove extending completely round the cartridge. In the same way and under the same conditions the grooves 12 at the forward end of the shell portions 1 and 2 and the groove 14 in the collar 9 coact to form a similar annular groove. In each of the grooves so formed is placed a resilient band numbered 15 and 16, respectively. As shown, these are C-shaped bands, of any desired spring metal, either in wire or strip form.

The operation of the device will be readily understood from an inspection of Figs. 1, 2, 4, and 5 of the drawings. Figs. 1 and 4 show the cartridge with the bolt therein as inserted in a recess or aperture 17 in a wall 18. A plate 19 is shown as being secured to the wall 18 by means of the bolt 8 and the cartridge with which it engages. In Fig. 2 of the drawings the bolt 8 is shown as screwed home, drawing the nut 5 and the collar 9 together, so as to spread apart the shells 1 and 2, thereby expanding the cartridge and holding the plate 19 firmly against the wall 18. It will be seen that the bands 15 and 16 in Fig. 1 engage in the grooves 13 and 14 of the nut and collar, respectively, so that these parts are held from accidental disengagement. When the cartridge is expanded, as shown in Fig. 2, the bands 15 and 16 will be retained in the grooves 11 and 12, respectively; but the nut 5 and collar 9 will be drawn toward each other, so that their grooves 13 and 14 are disengaged from the band. It is obvious that when the bolt 8 is again retracted, so as to permit the nut 5 and collar 9 to slide from between the beveled faces of the shells to their original position, as shown in Fig. 1, the bands 15 and 16, which assist in returning the nut and collar to their positions, also act to again hold them in this position and prevent the separation of the parts of the cartridge.

The form of device shown in Fig. 3 of the drawings is similar to that above described, except that the recess 4 at the forward end of the shell portions 21 and 22 is omitted and the collar 9 is likewise omitted, the forward end of the shell being substantially transverse of its length. Bands 23 24 are provided, as before, the band 23 engaging in grooves 25, formed at the rear end of the cartridge-shells 21 22, and in transverse grooves 26, formed in the nut 27. It is plain that when the cartridge is expanded by the action of the bolt 8 the wedge-shaped nut 27 will be drawn between the beveled walls of the shells 21 22, which shells will be separated, thereby opening the resilient bands 23 and 24, the band 24 being still retained in the grooves at the forward end of the shells 21 22 and the band 23 being retained in the grooves 25 of the shells and slipping out of the groove 26 in the nut 27.

The particular advantage of my invention, as above recited, lies in the fact that the entire cartridge, consisting of the shell portions, the wedge-shaped nut, and the wedge-shaped collar, where this is employed, may be secured together by means of the resilient encircling bands, and the entire cartridge may be handled integrally and carried from place to place in a workman's kit without danger of loss of any parts. It is also clear that this integral cartridge may be very conveniently inserted into the hole in which it is to be secured and that the bands act to hold the parts together during the insertion of the bolt, so that these are not likely to be displaced thereby.

Where in the claims I use the phrase "resilient band," it is evident that I intend to include any equivalent therefor which serves to resiliently engage the nut and collar with the longitudinal segments when these are in their non-operative position and which permits the inward movement of the nut and collar or the nut alone by releasing the nut during its forward movement.

Having thus described my invention, what I claim is—

1. An expansion-bolt cartridge comprising a plurality of longitudinally-divided shell portions having beveled ends coacting to form a tapered recess, a wedge-shaped nut in said recess, said shells and said nut having transverse grooves coacting to form an annular groove when said nut is substantially in its retracted or non-expanding position, and a resilient band detachably engaged in said annular groove for holding the parts together.

2. An expansion-bolt cartridge comprising a plurality of longitudinally-divided shell portions, beveled or cut away at both ends to form coacting tapered recesses, a wedge-shaped nut in one of said recesses, and a wedge-shaped collar in the other recess, said shells having transverse grooves adjacent each end, and said nut and said collar each having transverse grooves positioned to coact with the grooves in said shells to form annular grooves when said nut and said collar are in their retracted or non-expanding position, and a resilient band detachably engaged in each of said annular grooves for holding the parts together.

In testimony whereof I have signed this specification in the presence of two subscribing witnesses.

EDWARD ANTHONY STULZ.

Witnesses:
C. P. BOYD,
JOS. KENNEDY.